Aug. 30, 1955 SHINJIRO KODAMA ET AL 2,716,629
METHOD FOR PREVENTING AMMONIUM CARBAMATE ACCUMULATION
IN UREA SYNTHESIS LIQUOR STILLS
Filed April 13, 1954
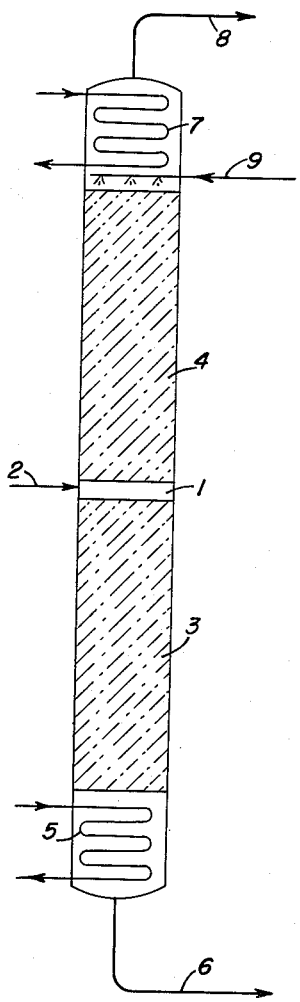
SHINJIRO KODAMA
TOSHIHIDE GOTO
DAISUKE KOMIYAMA
TADANAO OTA
NOBUO ZEN
INVENTORS.
BY Elmer W. Harmon
ATTORNEY.

United States Patent Office 2,716,629
Patented Aug. 30, 1955

2,716,629

METHOD FOR PREVENTING AMMONIUM CARBAMATE ACCUMULATION IN UREA SYNTHESIS LIQUOR STILLS

Shinjiro Kodama, Kyoto, Kyoto Pref., and Toshihide Goto, Daisuke Komiyama, Tadanao Ota, and Nobuo Zen, Niihama-shi, Ehime Pref., Japan Application April 13, 1954, Serial No. 422,984

4 Claims. (Cl. 202—39.5)

This invention relates to the synthesis of urea. More particularly it relates to the recovery of ammonia from the effluent liquor obtained from a urea synthesis by the reaction of carbon dioxide and ammonia. Still more specifically, it relates to a more efficient method of separating and recovering unreacted ammonia.

It has long been known to synthesize urea by reacting together carbon dioxide and ammonia in an autoclave under conditions of elevated temperature and pressure. Resultant reaction liquor at the completion of the reaction contains urea, ammonia in large excess, carbon dioxide, water, ammonium carbamate and possibly other compounds. Among other problems, after discharging this liquor from the autoclave it is necessary to recover the excess ammonia for recycling to the autoclave in order that the urea synthesis be economical and efficient.

There are several known methods which ordinarily will accomplish the desired ammonia recovery in an efficient manner. Perhaps the best of these is as follows: Solution, containing the urea, ammonia and carbon dioxide along with the other compounds, is passed into a distillation column, usually containing either packing or bubble plates. Heat is supplied at the bottom of the column by means of a reboiler or heating coil or the like. Gases near the top of the column are cooled as by a reflux condenser so that at least about one-eighth of the gases are condensed as reflux. The zone immediately beneath the reflux condenser is known as the enrichment zone since it is in this zone that the carbon dioxide is washed out of the rising gases by the refluxing condensate; the remaining gases are enriched in ammonia. Substantially pure ammonia is removed from the topmost portion of the column above the reflux condenser and is recirculated to the urea synthesis autoclave.

Vapors in equilibrium with the liquor in the reboiler rise into the column. In the enrichment zone some of the ammonia reacts with the carbon dioxide and ammonium carbamate separates out, particularly in the cooler parts. Refluxing condensate liquor washes it down into the reboiler where it breaks down, at least in part, to ammonia, carbon dioxide and water and the wet vapors again rise in the column. Thus in addition to the other equilibria, there is that of the ammonium carbamate formation and return which comprises a closed circuit load in the column. Ammonium carbamate in the reaction liquor together with any which is flushed down the column but does not break down is removed with the still bottoms. The column bottoms are led off from the bottom of the column and so treated as to separate the compounds, including urea, contained therein.

Such a process as described above usually functions efficiently and economically. However, the conditions under which the column would function efficiently depend on the analysis of the autoclave effluent. If the analysis is constant the column operates efficiently under one set of conditions of temperature and pressure. However, under some circumstances, particularly if the water content in the autoclave effluent is reduced due to some change in the reactants fed to the autoclave, it is not only possible but likely to find the cold top zone of the column clodded with unreturned ammonium carbamate. Not only is this objectionable from an operational point of view but it may often result in $CO_2$ being found in the recovered ammonia. Thus, although the above described process is one of the best of all processes to recover ammonia from urea synthesis liquid, it is subject to this shortcoming. Several proposals have been made to overcome this difficulty. All, however, require additional apparatus and processing steps.

It is an object of the present invention to develop an improvement over the above-described process which eliminates such a shortcoming. It is a further object to accomplish this without the necessity for additional apparatus or treating steps.

This object is achieved in a surprisingly straightforward manner. In accordance with the present invention, water is added to the distillation process at some level in the enrichment section of the column. This additional water, which may be added as such or in the form of aqua ammonia, serves to prevent the accumulation of ammonium carbamate with resultant blockages in the column. Under the conditions that exist in the column the additional amount of water constantly insures that all ammonium carbamate is carried down through the column and into the heated section at the bottom. The aqueous ammonium carbamate so carried down to the bottom of the column breaks down to ammonia, carbon dioxide and water and wet vapors and gases again rise as noted above.

The principle of the invention will be illustrated in conjunction with the accompanying drawing. The latter is a simplified diagram showing the usual arrangement of the apparatus elements and the flow of materials therethrough.

As shown in the drawing, synthesis liquid from the reaction autoclave, the latter not being involved here and not shown, enters the operating column 1, through conduit 2, at a level between a lower, packed stripping zone 3 and an upper packed enrichment zone 4. The lower portion of the column contains a conventional coil heated still 5 and ammonia-free still bottoms are withdrawn from the lower levels through a suitable conduit 6. The uppermost section contains a condenser 7 and carbon-dioxide free ammonia is discharged at or near the top through a suitable conduit 8. According to the present invention, water, either per se or as aqua ammonia is introduced at the upper part of enrichment zone 4 through a suitable conduit 9.

The column usually operates at a pressure in the range of about 10–30 atmospheres. The temperature of the bottoms, which controls to some extent the temperature throughout the entire column, may be adjusted so as to yield pure ammonia uncontaminated with carbon dioxide at the top.

Since water, as such or in the form of aqua ammonia, is added to the synthesized liquid in accordance with this invention, the water leaving the bottom is naturally increased by the amount added. However, only a relatively small amount of water will serve to prevent the plugging of a column by ammonium carbamate formation therein and no auxiliary equipment is required for the removal of this excess water from the bottoms.

Although it seems contra to good practice to add water to the ammonia recovery, still the amount of water added to the distillation process is small compared with the throughput of the column. An excess of water over that needed to remove all carbamate does no harm except to place a greater heat load on the column. Furthermore, although all water must be removed from the urea solution in the urea recovery portion of the entire process, the present process does not unduly complicate this. Generally speaking, water may be added in the amount of 100–600 lbs. per ton of urea through the column, although the preferred range is 300–400 lbs. of water per ton of urea. When used in such amounts the process may be reliably carried out over periods of weeks whereas without it the ammonia purity may suffer and the plugging by carbamate be highly troublesome.

The following examples illustrate good practice in carrying out the process of the present invention.

*Example 1*

A solution containing 3000 lbs. of urea per hour synthesized at a mol ratio or ammonia:carbon dioxide of 4:1 is led into a distillation tower under 20 atmospheres pressure. The distillation is conducted by adding 550 lbs. of water per hour at the enriching section of the tower while the ammonia is refluxed at a reflux ratio of 0.8.

After continuous operation for 30 days during which time distilled ammonia of 100% purity had been continuously obtained there was no blockage of the column and nothing adhered to the packing.

*Example 2*

The conditions of Example 1 were repeated except that 90% aqua ammonia was introduced into the enriching section at the rate of 2680 lbs. per hour.

Equally successful results were obtained as in Example 1.

We claim:
1. In a method for synthesizing urea which includes the steps of reacting ammonia and carbon dioxide to form a urea- and ammonia- containing solution, heating said solution whereby water, ammonia and carbon dioxide vapors are liberated, passing said vapors successively through a stripping zone and an enrichment zone of a distilling column, removing ammonia from the final stage and recycling the ammonia, the improved method of insuring carbon-dioxide free ammonia which comprises adding water to the enrichment section of said column.
2. The method according to claim 1 wherein said water is added in the form of aqua ammonia.
3. The method according to claim 1 wherein said water is added in an amount equivalent to 100–600 lbs. of water per ton of urea passing through the column.
4. The method according to claim 3 wherein said amount of water is 300–400 lbs. of water per ton of urea passing through the column.

References Cited in the file of this patent

UNITED STATES PATENTS

| | | |
|---|---|---|
| 2,662,041 | Dougherty et al. | Dec. 8, 1953 |
| 2,662,042 | Dougherty et al. | Dec. 8, 1953 |
| 2,678,304 | Buchner | May 11, 1954 |

OTHER REFERENCES

"Chemical Engineering Progress," vol. 50, No. 7, July 1954 "Discussion," pg. 331.